US009275386B2

(12) United States Patent
Olson et al.

(10) Patent No.: US 9,275,386 B2
(45) Date of Patent: Mar. 1, 2016

(54) METHOD FOR FACILITATING PAYMENT WITH A PROGRAMMABLE PAYMENT CARD

(71) Applicant: Protean Payment, Inc., Ann Arbor, MI (US)

(72) Inventors: Thiago Olson, Ann Arbor, MI (US); Christopher Bartenstein, Ann Arbor, MI (US); Henry Balanon, Ann Arbor, MI (US)

(73) Assignee: Stratos Technologies, Inc., Ann Arbor, MI (US)

( * ) Notice: Subject to any disclaimer, the term of this patent is extended or adjusted under 35 U.S.C. 154(b) by 0 days.

(21) Appl. No.: 14/542,245

(22) Filed: Nov. 14, 2014

(65) Prior Publication Data

US 2015/0170014 A1 Jun. 18, 2015

Related U.S. Application Data

(60) Provisional application No. 62/003,446, filed on May 27, 2014, provisional application No. 61/962,709, filed on Nov. 14, 2013.

(51) Int. Cl.
*G06K 5/00* (2006.01)
*G06K 19/00* (2006.01)
(Continued)

(52) U.S. Cl.
CPC ........ *G06Q 20/341* (2013.01); *G06K 19/06196* (2013.01); *G06Q 20/354* (2013.01)

(58) Field of Classification Search
CPC ............ G06K 19/06206; G06K 7/082; G06K 19/06187; G06K 19/08; G06K 19/12; G06Q 20/341; G06Q 20/354; G06Q 20/227

USPC .................................. 235/375, 380, 487, 493
See application file for complete search history.

(56) References Cited

U.S. PATENT DOCUMENTS 6,592,044 B1 7/2003 Wong et al.
6,595,342 B1 7/2003 Maritzen et al.
(Continued)

FOREIGN PATENT DOCUMENTS

WO 0154109 A 7/2001
WO 2009082760 A 7/2009

OTHER PUBLICATIONS

BWOne. Credit Card 2.0 Powered Cards by Dynamics, Inc. at CES Unveiled NYC 2010—BWOne.com. Nov. 2010. [retrieved on Oct. 11, 2013] Retrieved from the internet: <http://www.youtube.com/watch?v=IVuUCbkYNxA>.

*Primary Examiner* — Laura Gudorf
(74) *Attorney, Agent, or Firm* — Jeffrey Schox; Diana Lin

(57) ABSTRACT

One variation of a method for facilitating payment with a payment card includes: in response to an input on the surface of the payment card exceeding a first input threshold magnitude, transitioning from the off state into a primary payment mode; in the primary payment mode, activating a first timer of a first duration; in response to expiration of the first timer prior to a magnetic read head proximal the payment card, transitioning from the primary payment mode into a sleep state; in response to an input on the surface of the payment card exceeding a second input threshold in the sleep state, transitioning into a secondary payment mode; in the secondary payment mode, activating a second timer of a second duration less than the first duration; and driving a magnetic stripe emulator within the payment card according to a magnetic sequence command corresponding to a magnetic stripe card.

20 Claims, 6 Drawing Sheets

(51) Int. Cl.
*G06K 19/06* (2006.01)
*G06Q 20/34* (2012.01)

(56) References Cited

U.S. PATENT DOCUMENTS

| | | | |
|---|---|---|---|
| 6,925,439 B1 | 8/2005 | Pitroda | |
| 7,097,108 B2 | 8/2006 | Zellner et al. | |
| 7,127,236 B2 | 10/2006 | Khan et al. | |
| 7,246,752 B2 | 7/2007 | Brown | |
| 7,380,710 B2 | 6/2008 | Brown | |
| 7,472,829 B2 | 1/2009 | Brown | |
| 7,543,739 B2 | 6/2009 | Brown et al. | |
| 7,552,869 B1 | 6/2009 | Ramachandran | |
| 7,578,437 B2 | 8/2009 | Lu et al. | |
| 7,580,898 B2 | 8/2009 | Brown et al. | |
| 7,584,153 B2 | 9/2009 | Brown et al. | |
| 7,621,458 B2 | 11/2009 | Zellner et al. | |
| 7,631,804 B2 | 12/2009 | Brown | |
| 7,641,124 B2 | 1/2010 | Brown et al. | |
| 7,690,580 B2 | 4/2010 | Shoemaker | |
| 7,784,687 B2 | 8/2010 | Mullen et al. | |
| 7,793,851 B2 | 9/2010 | Mullen | |
| 7,815,114 B2 | 10/2010 | Mesaros | |
| 7,823,794 B2 | 11/2010 | Li et al. | |
| 7,828,220 B2 | 11/2010 | Mullen | |
| 7,931,195 B2 | 4/2011 | Mullen | |
| 7,954,705 B2 | 6/2011 | Mullen | |
| 7,954,708 B2 | 6/2011 | Blossom | |
| 7,954,724 B2 | 6/2011 | Poidomani et al. | |
| 8,011,577 B2 | 9/2011 | Mullen et al. | |
| 8,015,592 B2 | 9/2011 | Doughty et al. | |
| 8,020,775 B2 | 9/2011 | Mullen et al. | |
| 8,066,191 B1 | 11/2011 | Cloutier et al. | |
| 8,074,877 B2 | 12/2011 | Mullen et al. | |
| 8,104,679 B2 | 1/2012 | Brown | |
| 8,172,148 B1 | 5/2012 | Cloutier et al. | |
| 8,201,747 B2 | 6/2012 | Brown et al. | |
| 8,231,063 B2 | 7/2012 | Poidomani et al. | |
| 8,267,327 B2 | 9/2012 | Tsao et al. | |
| 8,282,007 B1 | 10/2012 | Cloutier et al. | |
| 8,286,876 B2 | 10/2012 | Mullen et al. | |
| 8,302,872 B2 | 11/2012 | Mullen | |
| 8,313,037 B1 | 11/2012 | Humphrey | |
| 8,660,948 B2 | 2/2014 | Dessert et al. | |
| 9,053,398 B1 * | 6/2015 | Cloutier | G06K 19/06206 |
| 2002/0120583 A1 | 8/2002 | Keresman et al. | |
| 2004/0035942 A1 | 2/2004 | Silverman | |
| 2008/0058014 A1 | 3/2008 | Khan et al. | |
| 2009/0159688 A1 | 6/2009 | Mullen et al. | |
| 2009/0159690 A1 | 6/2009 | Mullen et al. | |
| 2009/0159698 A1 | 6/2009 | Mullen et al. | |
| 2011/0167375 A1 | 7/2011 | Kocienda | |
| 2011/0218911 A1 | 9/2011 | Spodak | |
| 2011/0284632 A1 | 11/2011 | Mullen et al. | |
| 2012/0005076 A1 | 1/2012 | Dessert et al. | |
| 2012/0052800 A1 | 3/2012 | Bona et al. | |
| 2013/0103537 A1 | 4/2013 | Hewett | |
| 2013/0124319 A1 | 5/2013 | Hodge et al. | |
| 2013/0187753 A1 | 7/2013 | Chiriyankandath | |
| 2013/0228616 A1 | 9/2013 | Bhosle et al. | |

* cited by examiner

METHOD FOR FACILITATING PAYMENT WITH A PROGRAMMABLE PAYMENT CARD

CROSS-REFERENCE TO RELATED APPLICATIONS

This application claims the benefit of U.S. Provisional Patent Application No. 61/962,709, filed on 14 Nov. 2013, and U.S. Provisional Patent Application No. 62/003,446, filed on 27 May 2014, both of which are incorporated in their entireties by this reference.

Furthermore, this application is related to U.S. patent application Ser. No. 13/904,939, filed on 29 May 2013, which is incorporated in its entirety by this reference.

TECHNICAL FIELD

This invention relates generally to the field of bank cards and, more specifically, to a new and useful for facilitating payment with a reprogrammable payment card in the field of bank cards.

DESCRIPTION OF THE EMBODIMENTS

The following description of the embodiments of the invention is not intended to limit the invention to these embodiments, but rather to enable any person skilled in the art to make and use this invention.

1. Method

Figure 1:
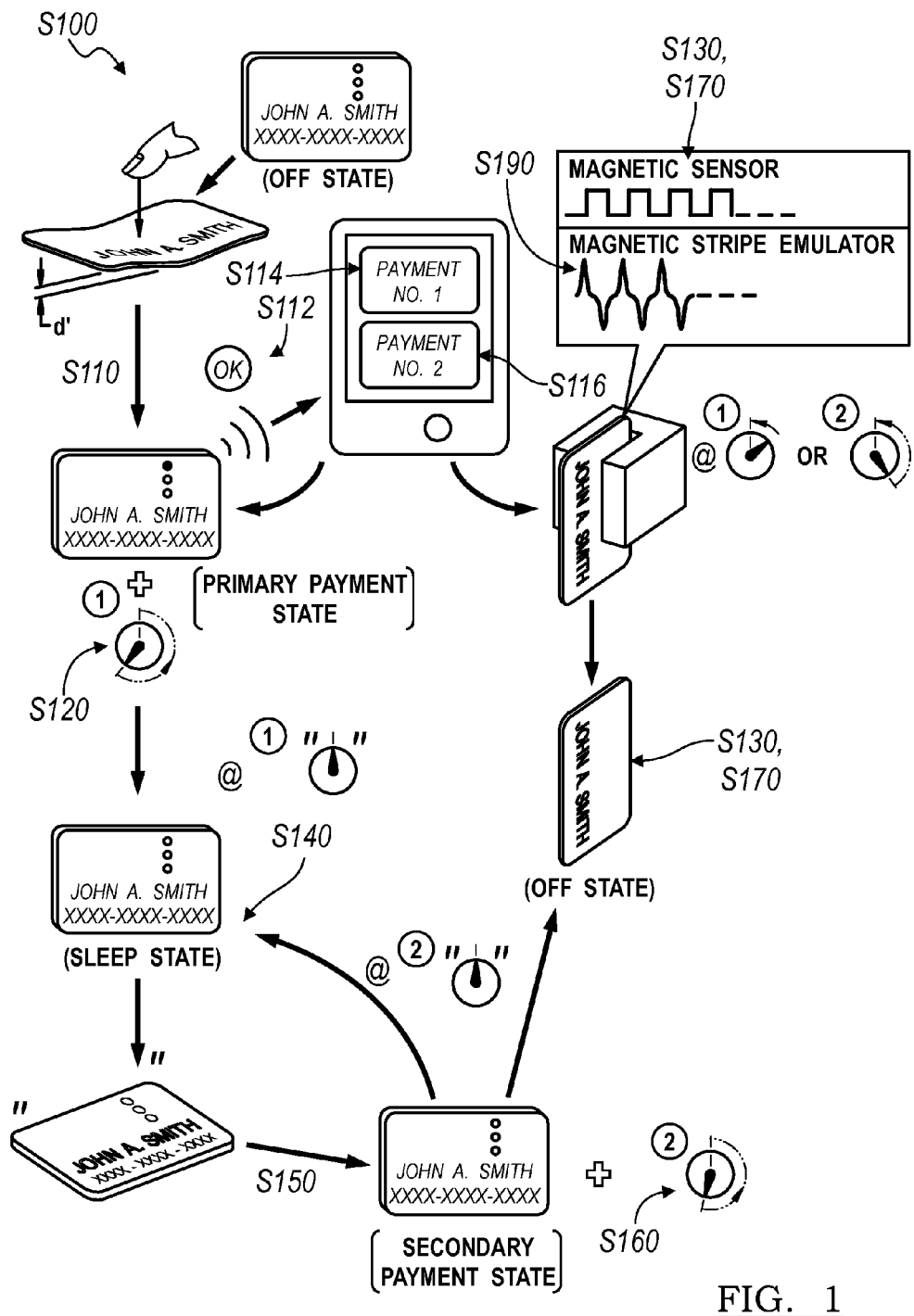
FIG. 1 is a flowchart representation of a method of the invention.

As shown in FIG. 1, a method for facilitating payment with a payment card includes: at the payment card, in response to detecting an input on a surface of the payment card exceeding a first input threshold magnitude, transitioning from an off state into a primary payment mode in Block S110; in the primary payment mode, activating a first timer of a first duration in Block S120; in response to detecting a magnetic read head proximal the payment card prior to expiration of the first timer, transitioning from the primary payment mode into the off state in Block S130; in response to expiration of the first timer prior to detecting a magnetic read head proximal the payment card, transitioning from the primary payment mode into a sleep state in Block S140; in response to detecting an input on the surface of the payment card exceeding a second input threshold magnitude less than the first input threshold magnitude in the sleep state, transitioning from the sleep state into a secondary payment mode in Block S150; in response to entering the secondary payment mode, activating a second timer of a second duration less than the first duration in Block S160; following detecting a magnetic read head proximal the payment card prior to expiration of the second timer, transitioning from the secondary payment mode into the off state in Block S170; in response to expiration of the second timer prior to detecting a magnetic read head proximal the payment card, transitioning from the secondary payment mode into the sleep state in Block S180; and in the primary payment mode and in the secondary payment mode, following detecting a magnetic read head proximal the payment card, driving a magnetic stripe emulator within the payment card according to a magnetic sequence command stored on the payment card and corresponding to a magnetic stripe card in Block S190.

Figure 5:
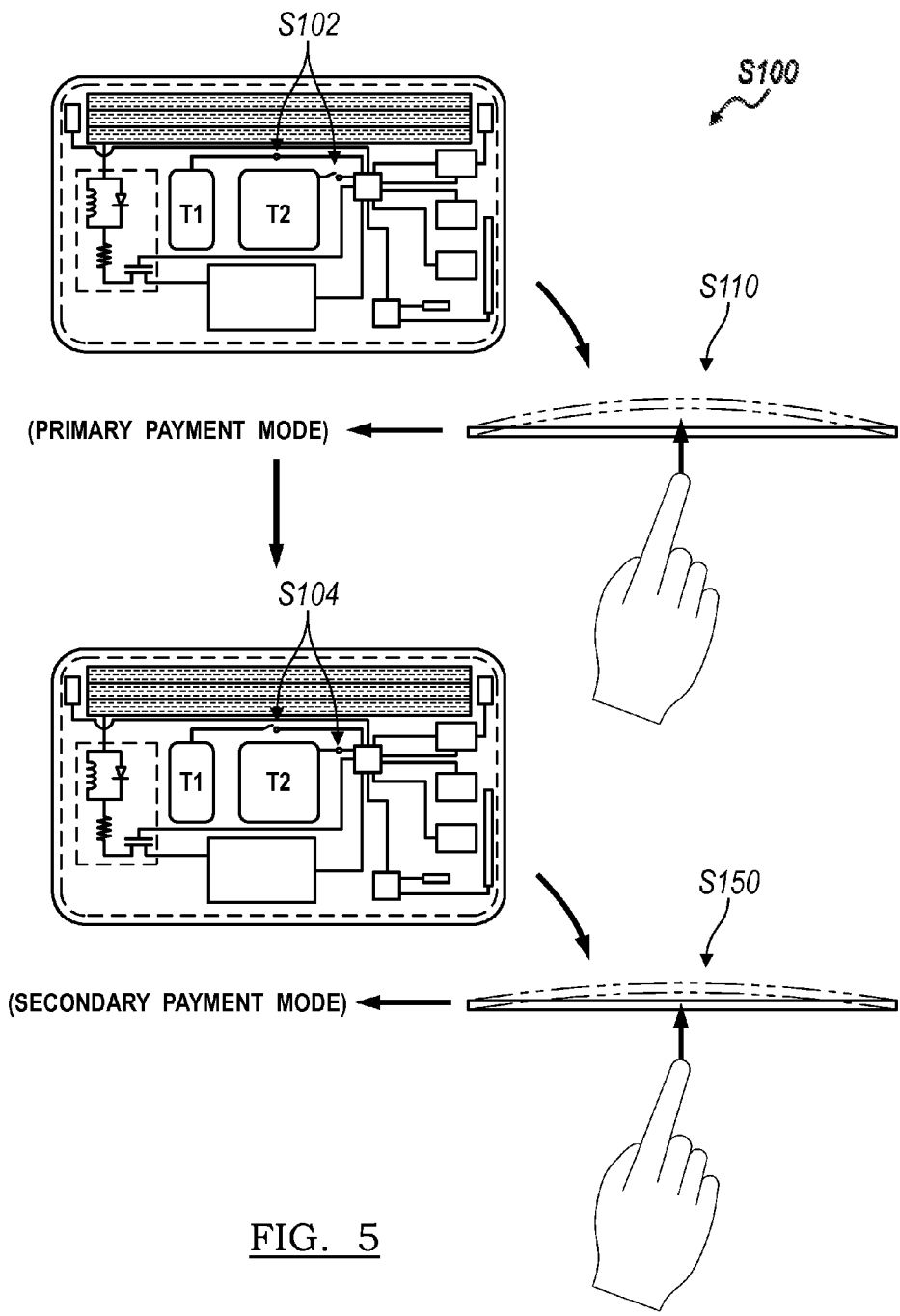
FIG. 5 is a flowchart representation in accordance with one variation of the method.

As shown in FIGS. 1 and 5, one variation of the method includes: at the payment card, in an off state, applying a first input threshold magnitude for detecting an input on a surface of the payment card in Block S102; in response to detecting an input on the surface of the payment card exceeding a first input threshold magnitude, transitioning from the off state into a primary payment mode in Block S110; in the primary payment mode, activating a first timer of a first duration in Block S120; in response to expiration of the first timer prior to detecting a magnetic read head proximal the payment card, transitioning from the primary payment mode into a sleep state in Block S140; in the sleep state, applying a second input threshold magnitude for detecting an input on the surface of the payment card, the second input threshold magnitude less than the first input threshold magnitude in Block S104; in response to detecting an input on the surface of the payment card exceeding the second input threshold magnitude in the sleep state, transitioning from the sleep state into a secondary payment mode in Block S150; in the secondary payment mode, activating a second timer of a second duration less than the first duration in Block S160; in the secondary payment mode, following detecting a magnetic read head proximal the payment card prior to expiration of the second timer, driving a magnetic stripe emulator within the payment card during an emulation cycle according to a magnetic sequence command stored on the payment card and corresponding to a static magnetic stripe card in Block S190; and in response completion of the emulation cycle, transitioning from the secondary payment mode into the off state in Block S170.

2 Applications

Figure 3:
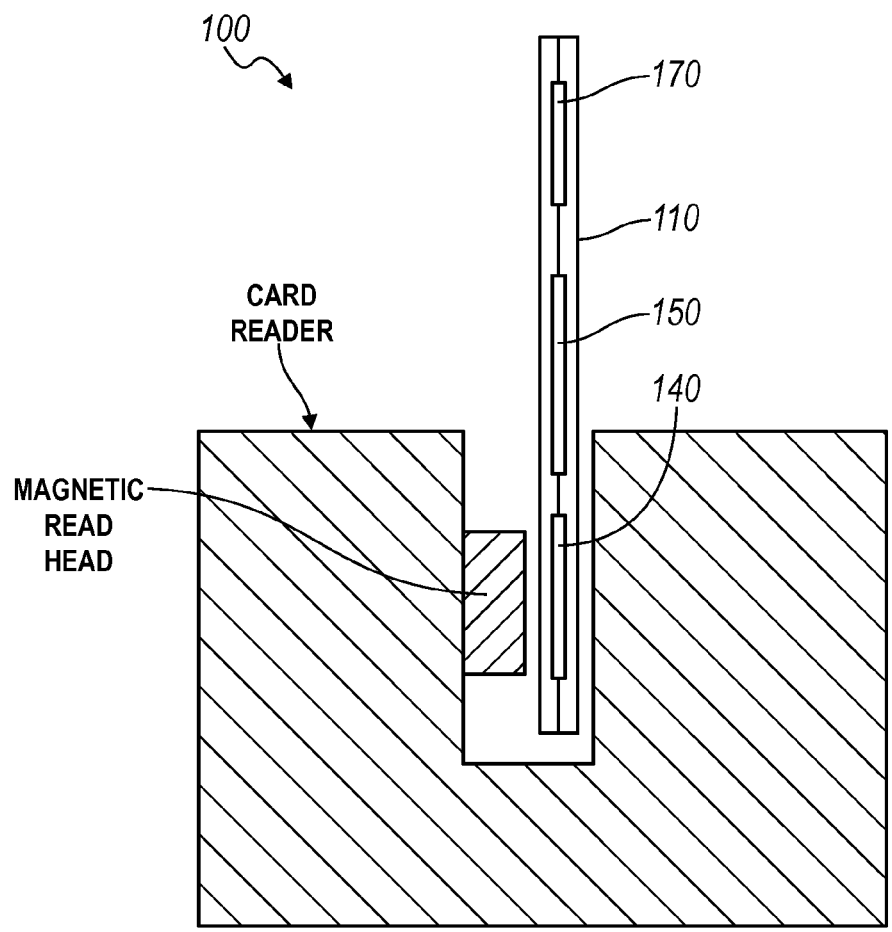
FIG. 3 is a graphical representation in accordance with the first method and the second method.

Generally, the method can be implemented on a reprogrammable payment card—such as described in U.S. patent application Ser. No. 13/904,939—to enable delayed payment with a payment method stored on the payment card once use of the payment card is authenticated or authorized. In particular, the payment card can store one or more payment methods in the form of magnetic sequence commands executable by a magnetic stripe emulator to mimic static magnetic stripes within plastic credit, debit, gift, and/or other payment cards when the reprogrammable payment card is swept passed a card reader (e.g., a magnetic read head), as shown in FIGS. 1 and 3. The payment card can also store magnetic sequence commands corresponding to static magnetic stripes of other card types, such as magnetic-stripe-based door access cards, personal identification cards, or rewards cards. A particular payment method, door code, personal information, etc.— stored in the form of a magnetic sequence command on the payment card—can thus be selected for an upcoming transaction between the payment card and a magnetic read head, and the payment card can thus emulate the selected payment method, door code, or personal information by driving the magnetic stripe emulator, arranged within the payment card, according to the corresponding magnetic sequence command.

However, because such a reprogrammable payment card may require power to repeatedly probe for a nearby card reader to trigger powered emulation of a static magnetic stripe at the magnetic stripe emulator contained therein, repeated long delays between activation of the payment card and use of the payment card in a subsequent transaction may relatively quickly consume power from a battery within the payment card, thereby negativing a useful life of the payment card. For example, once a transaction with the payment card is authorized and the payment card armed to emulate a selected payment method, the payment card can arm the magnetic stripe emulator within the payment card, sample a magnetic read head sensor until a magnetic read head is detected adjacent the payment card, and trigger the magnetic stripe emulator to emulate the selected payment method once a magnetic read head is detected; however, longer time durations between activation of the payment card and emulation of a payment method can drain charge from a battery contained within the payment card, thereby reducing the life of the payment card for the battery that is not rechargeable or requiring recharge sooner for the battery that is rechargeable. Therefore, the payment card can implement the method to handle transitions between an off state, a primary payment mode, a secondary payment mode, and a sleep state. Accordingly, the payment card can thus operate in a relatively low(est) power setting and at a first sensitivity to an input on its surface in the off state, can sample a magnetic read head sensor to detect an adjacent magnetic read head and can be armed to emulate a selected payment method for a first period of time (e.g., ninety seconds) in the primary payment mode, can operate in a relatively low(est) power setting but at a heightened sensitivity to an input on its surface in the sleep state, and can sample the magnetic read head sensor for an adjacent magnetic read head and can be armed to emulate a selected payment method for a more limited period of time (e.g., 500 microseconds) in the secondary payment mode.

In one example application of the payment card executing the method, an owner of the payment card (i.e., the "user") enters a bar early one evening, orders a cocktail containing bourbon, sweet vermouth, and a cherry, removes the reprogrammable payment card from his wallet, taps the payment card to trigger the payment card to enter the primary payment mode, selects a payment method (or leaves a default payment method in place) at the payment card, and hands the payment card to a barkeeper; the barkeeper stores the payment card behind the bar until the user is ready to close his tab. A first timer for ninety seconds was initiated at the payment card once the payment method was selected; ninety seconds later, the first timer on the payment card expires and the payment card transitions into the sleep state because the payment card was not swept passed a card reader before expiration of the first timer (i.e., because the magnetic read head sensor in the payment card did not detect a magnetic read head adjacent the payment card before expiration of the first timer). As the evening progresses, the user orders several more cocktails, and the payment card remains with the barkeeper as the user runs up his tab on overpriced, under-alcoholed San Francisco cocktails. Soon after the barkeeper shouts last call, the user wearily indicates his wish to retire, and the barkeep retrieves the user's payment card. When the barkeeper handles the payment card, slight deflection of the payment card wakes an internal processor within the payment card, thereby triggering the payment card to enter the secondary payment mode. Once in the secondary payment mode, the payment card initiates a second timer for 1200 milliseconds. However, the barkeep takes his time selecting the correct tab for the user, and the payment card returns to the sleep state upon expiration of the second timer because no magnetic read head was detected by the magnetic read head sensor within the payment card. Finally, the barkeeper begins to swipe the payment card through a card reader, and deflection of the payment card by handling again wakes the processor into the secondary payment mode, and the magnetic read head sensor detects the card reader adjacent the payment card, thereby triggering the processor to drive the magnetic stripe emulator according to the payment method—selected earlier in the evening by the user—as the payment card is swept through the card reader by the barkeeper. Once the magnetic stripe emulator completes the magnetic sequence command for the selected payment method, the payment card transitions back into the off state, the barkeeper returns the payment card to the user, and the user stumbles home.

3. Payment Card

Figure 2A:
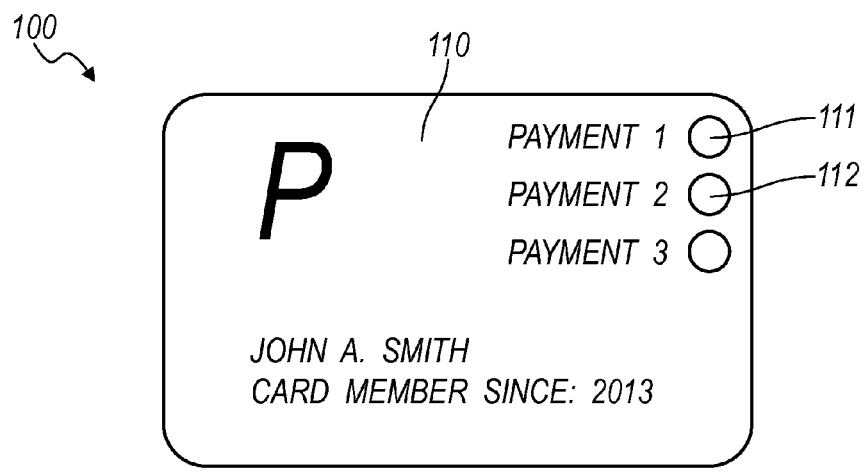
FIGS. 2A, 2B, and 2C are schematic representations of a payment card in accordance with the method.
Figures 2B, 2C:
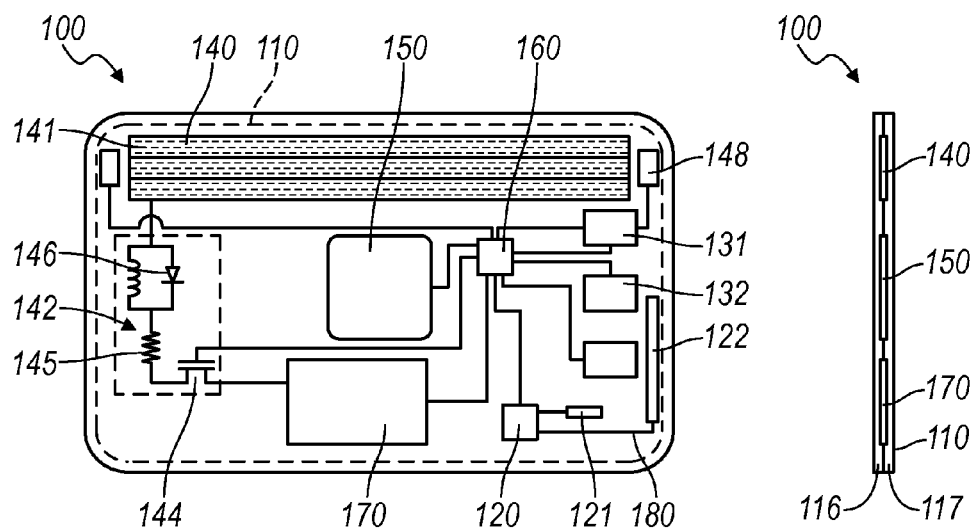

As described in U.S. patent application Ser. No. 13/904,939 and shown in FIGS. 2A, 2B, and 2C, the payment card can include: a sheet 110 including a first icon 111 and a second icon 112; a transducer 150 arranged within the sheet 110 and configured to output a voltage in response to an impulse on a surface of the sheet 110; a wireless communication module 120; a first input region 131 adjacent the first icon 111; a second input region 132 adjacent the second icon 112; a magnetic stripe emulator 140; a magnetic read head sensor configured to detect a magnetic read head proximal the payment card; and a processor 160 arranged within the sheet 110 and configured to transition from a passive state (e.g., the off state, the sleep state) into an active state (e.g., the primary payment mode, the secondary payment mode) in response to receiving a voltage output from the transducer 150, to receive a first magnetic sequence command associated with a first payment method and a second magnetic sequence command associated with a second payment method through the wireless communication module 120, to assign the first payment method to the first input region 131 and the second payment method to the second input region 132, to receive a selection for the second payment method from the second input region 132 in response to an input adjacent the second icon 112, and to control the magnetic stripe emulator 140 according to the second magnetic sequence command in response to receiving the selection for the second payment method.

Generally, the payment card functions to consolidate multiple plastic payment cards into a single physical card that can imitate payment functionalities of the multiple plastic payment cards through manipulation of a magnetic stripe emulator. For example, the payment card can imitate a user's debit card issued through a bank, a user's primary credit card issued by a preferred credit card company, and a user's secondary credit card issued by another credit card company by selectively driving the magnetic stripe emulator according to a unique magnetic sequence command associated with each individual card. The payment card can additionally or alternatively imitate a gift card, an identification (i.e., ID) card (e.g., a driver's license), a loyalty card, a door or gate access card, or any other individual card containing data in a magnetic stripe. The payment card can define a form factor substantially similar to that of a standard plastic payment card, that is, 3.370" (85.60 mm) wide by 2.125" (53.98 mm) tall by 0.06" thick.

The payment card can thus include multiple "payment slots," each holding data (e.g., a magnetic stripe sequence command) pertaining to a particular payment method loaded onto the payment card. For example, a "first payment slot" on the payment card can "hold" (e.g., point to) credit card data, a "second payment slot" on the payment card can hold debit card data, and a "third payment slot" on the payment card can hold gift card data; a user can thus select one of the first, second, and third slots to arm the magnetic stripe emulator (or the processor) within the payment card with the corresponding payment method. Subsequently, the payment card can drive the magnetic strip emulator according to a magnetic stripe sequence corresponding to the payment method in the selected payment slot to enable a transaction with the payment method when the payment card is swept passed a card reader (e.g., a magnetic read head). The payment card can also interface with a mobile computing device to upload new payment method data to payment slots on the payment card, to delete payment method data from the payment card, to control payment card functions asynchronously or in real-time, to authenticate an upcoming transaction, etc.

4. Off State to Primary Payment Mode

Block S110 of the method recites, at the payment card, in response to detecting an input on a surface of the payment card exceeding a first input threshold magnitude, transitioning from an off state into a primary payment mode. Generally, Block S110 functions to transition the payment card from an "off state" into a "primary payment mode" in response to an input on the payment card by a user, such as in preparation for use of the payment card in an upcoming transaction. In particular, the payment card can operate in a relatively lowest-power setting in the off state, such as by ceasing operation of an internal wireless communication module and disabling sensing routines at an internal processor for internal magnetic read head sensor(s) and input (e.g., capacitive touch) sensors correspond to payment slots on the payment card. The payment card can further transition into a higher-power setting in the primary payment mode, wherein operation of the wireless communication module is enabled to establish a wireless connection between the payment card and a wirelessly-paired mobile computing device, wherein the processor polls the magnetic read head sensor(s) to detect an magnetic read head adjacent the payment card, and wherein the processor polls the input sensors to detect a selection for a payment method for an upcoming transaction at the payment card.

In one implementation and as described in U.S. patent application Ser. No. 13/904,939, the processor within the payment card implements Block S110 by interfacing with a piezoelectric transducer electrically coupled to a first 'wake' interrupt-enabled input pin of the processor. In this implementation, when a user taps on, bends, or otherwise handles the payment card with sufficient force, the piezoelectric transducer outputs an electrical signal—exceeding a threshold voltage set at the first interrupt-enabled pin—to the first interrupt-enabled pin of the processor, and the processor wakes from the off state and transitions into the primary payment mode accordingly. Generally, a voltage output of the piezoelectric transducer can be proportional to a maximum degree of deflection of the piezoelectric transducer and/or to a degree of deflection of the piezoelectric transducer over a period of time (e.g., a rate of deflection). The processor can also be configured to trigger an interrupt when a voltage at the first interrupt-enabled input pin—electrically coupled to the piezoelectric transducer—exceeds a first threshold voltage (e.g., 2.2V for a 3.3V CMOS logic processor, 2V for a 5V TTL logic processor). Alternatively, the first interrupt-enabled input pin of the processor can be coupled to the piezoelectric transducer via a signal conditioning circuit—such as including a Zener diode or a comparator operation amplifier (op amp)—that outputs a voltage to the first interrupt-enabled input pin of the processor to trigger an interrupt at the processor when a voltage output of the piezoelectric transducer exceeds the first threshold voltage (i.e., a first input threshold magnitude) set or defined by the signal conditioning circuit (e.g., 2.5 V for a Zener diode). In particular, the piezoelectric transducer can output a signal of magnitude value (e.g., peak voltage) exceeding the first input threshold magnitude—coded into the first interrupt-enabled input pin of the processor or defined by the signal conditioning circuit—in response to an input on the surface of the payment card that bends or deflects the surface out of plane by at least a first degree; and the processor can implement Block S110 to transition from the off state into the primary payment mode in response to a magnitude value (e.g., peak voltage) of a signal output from the piezoelectric transducer exceeding the first input threshold magnitude.

Alternatively, a motion sensor (e.g., an accelerometer, a tilt sensor, a gyroscope) can be electrically coupled to the first interrupt pin of the processor, and the processor can implement Block S110 to transition from the off state into the primary payment mode when a user taps on, bends, or moves (e.g., jostles) the payment card with sufficient vigor that the motion sensor outputs an electrical signal—exceeding the first input threshold magnitude—to the first interrupt pin of the processor. For example, in the off state, the processor can sample an accelerometer within the payment card at a first sampling rate (e.g., 1 Hz), compare a form of an output of the accelerometer (e.g., a digital form of an analog voltage output of the accelerometer) to the first input threshold magnitude (e.g., voltage threshold), and transition the payment card from the off state into the primary payment mode in response to the form of the output of the accelerometer exceeding the first input threshold magnitude, such as if accelerations along three Cartesian axes of the payment card from an input on the payment card yields a composite voltage output from the accelerometer that exceeds a threshold composite voltage at the first interrupt-enabled pin of the processor. Therefore, in this example, the processor can interface with an accelerometer within the payment card to transition from the off state into the primary payment mode when an impact on the payment card yields a detected acceleration exceeding a threshold acceleration; the processor can implement Block S110 by converting a voltage output from the accelerometer into a digital value and comparing this digital value to a threshold digital value to determine if the impact on the payment card is sufficient to wake the payment card from the off state into the primary payment mode.

Yet alternatively, in another implementation, the payment card can implement Block S110 to trigger entry into the primary payment mode in response to selection of an input region on the payment card. For example, an input region on the payment card can be electrically coupled to a first interrupt-enabled pin of the processor, and the input region can communicate a digital low voltage value to the first interrupt-enabled pin of the processor in a steady state and can communicate a digital high voltage value to the first interrupt-enabled pin of the processor when depressed (or vice versa); the processor can thus transition from the off state into the primary payment mode when the voltage across the first interrupt-enabled pin changes from a digital low voltage (e.g., ~0V) to a digital high voltage (e.g., ~3.3V). Similarly, the processor can implement Block S110 to trigger entry into the primary payment mode in response to entry of a first sequence of inputs onto one or more regions of the payment card, such as a sequence of inputs onto each of three input regions—corresponding to payment slots on the payment card—in the form of a passcode.

However, the payment card can implement Block S110 to handle any other type of input or sequence of inputs on the payment card to trigger the payment card (e.g., the processor within the payment card) to transition from the off state into the primary payment mode.

5. Authentication

Figure 4:
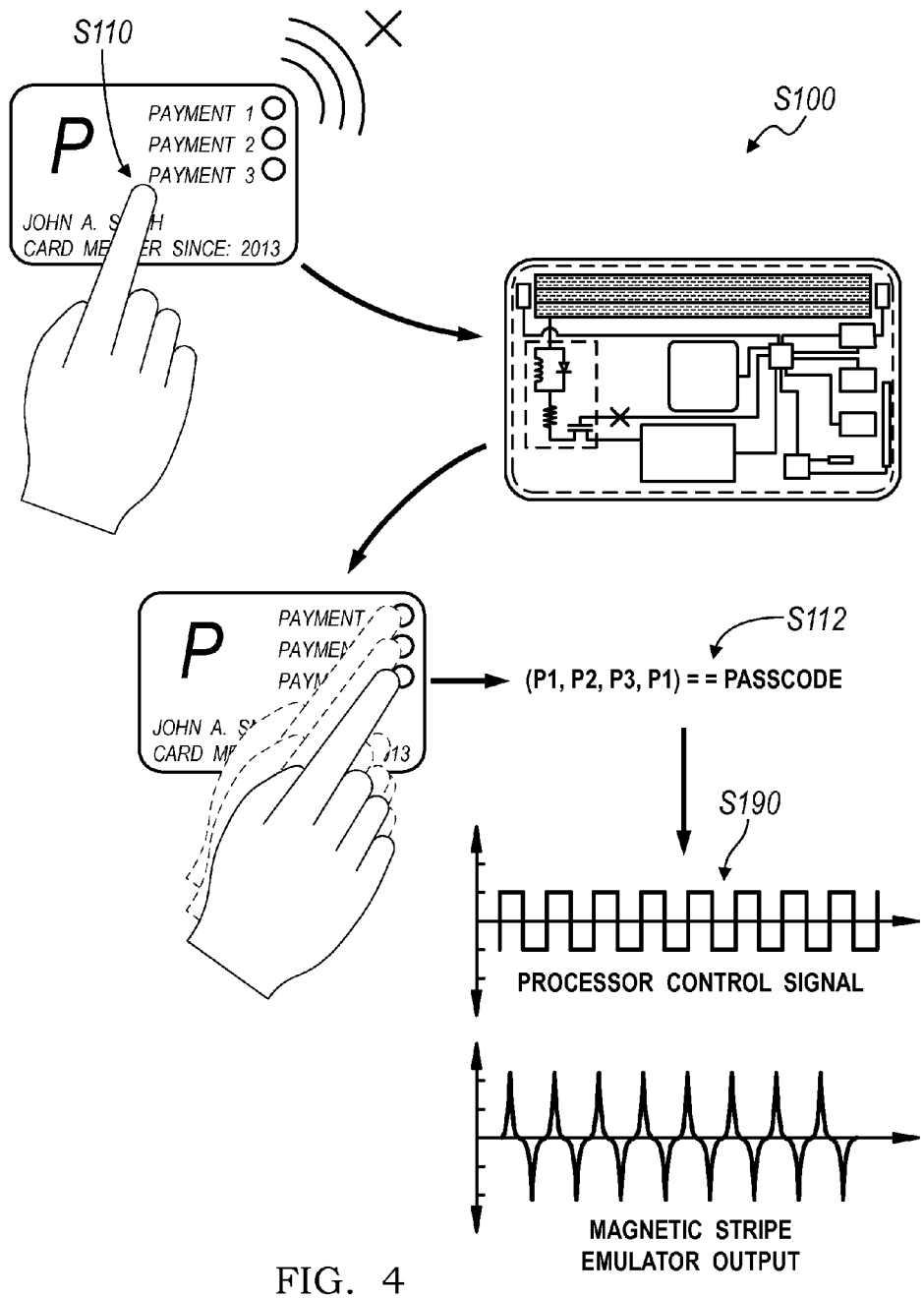
FIG. 4 is a flowchart representation in accordance with one variation of the method.

As shown in FIGS. 1 and 4, one variation of the method includes Block S112, which recites, in response to entering the primary payment mode, authenticating a future transaction with the magnetic sequence command. Generally, Block S112 functions to authenticate use of the payment card for a subsequent transaction once the payment card enters the primary payment mode.

In one implementation and as described in U.S. patent application Ser. No. 13/904,939, the processor executes Block S112 by attempting—through the wireless communication module—to establish a wireless connection with a computing device affiliated with the payment card. For example, a unique wireless address corresponding to a mobile computing device (e.g., a smartphone) associated with the payment card can be stored in memory on the payment card, such as in local memory on the wireless communication module. In this example, in response to transition from the off state into the primary payment mode, the processor can trigger the wireless communication module to attempt to pair wirelessly (e.g., over Bluetooth) with a local mobile computing device assigned the unique wireless address. If a mobile computing device with the unique wireless address is found and a wireless connection with the mobile computing device successfully established, the processor can authorize use of the payment card in a subsequent transaction. The processor can then execute Block S114, as described below, to arm a controller within the payment card to drive the magnetic stripe emulator according to a default magnetic stripe sequence command in response to authorization of use of the payment card. Alternatively, the processor can then execute Block S116, as described below, to receive a manual selection for a particular payment method (or other magnetic stripe card) for emulation in the upcoming transaction, and the processor can thus arm a controller within the payment card to drive the magnetic stripe emulator according to a corresponding magnetic stripe sequence command.

Thus, in the foregoing implementation, if the payment card succeeds in establishing a wireless connection with a particular (e.g., paired) mobile computing device, the processor can confirm that the payment card is sufficiently near (e.g., within a threshold authentication range of) the mobile computing device, which may indicate that an owner of the mobile computing device—who is also an owner of the payment card—is within a suitable proximity to the payment card. The processor can thus execute Block S112 to authenticate use of the payment card in a subsequent transaction.

However, in this implementation, if the wireless communication module fails to establish a wireless connection with the particular mobile computing device, the processor can prompt the user to enter a passcode as a backup authentication method in Block S112. For example, the processor can trigger a visual indicator (e.g., an LED lamp) within the payment card to signal to the user failure to authenticate use of the payment card (e.g., by flashing the LED lamp) though wireless communication with the affiliated mobile computing device and to thus prompt the user to enter a passcode into the payment card to manually authenticate use of the payment card. In this implementation, the processor can sample (e.g., poll) one or more input regions on the payment card to detect a sequence of inputs onto the payment card, and the processor can authenticate use of the payment card if the sequence of inputs matches a passcode stored on the payment card, such as described in U.S. patent application Ser. No. 13/904,939. However, the payment card can implement Block S112 in any other way to authenticate use of the payment card in a subsequent transaction—such as automatically based on proximity of the payment card to a paired mobile computing device or based on a passcode entered manually into the payment card—in response to entry of the payment card into the primary payment mode.

6. Magnetic Stripe Card Selection

As shown in FIG. 1, one variation of the method includes Block S114, which recites, in response to entering the primary payment mode, assigning a particular payment method selected for a preceding transaction to a default payment slot on the payment card. Generally, Block S114 functions to set a payment method used in a (immediately-) preceding transaction as a default payment method for the upcoming transaction. For example, the processor within the payment card can execute Block S110 by interfacing with a piezoelectric transducer to detect a tap input on a surface of the payment card and can thus transition the payment card into the primary payment mode accordingly; the processor can then execute Block S112 to authenticate use of the payment card and automatically execute Block S114 to automatically select a particular magnetic stripe sequence command—corresponding to a particular magnetic stripe card last used at the payment card—for the upcoming transaction. The payment card can thus implement Block S114 to set or select a default payment method for an upcoming transaction with the payment card based on a transaction history with the payment card, such as in response to authenticating use of the payment card in Block S112.

As shown in FIG. 1, one variation of the method includes Block S116, which recites, in the first mode, at the payment card, receiving a selection for a particular payment method from a set of payment methods stored on the payment card and arming the payment card to drive the magnetic stripe emulator according to a magnetic stripe sequence command corresponding to the particular payment method in response to the selection. Generally, Block S116 functions to receive a selection for a payment method (or other magnetic stripe card) corresponding to a magnetic stripe sequence command stored on the payment card and to set the payment card to emulate the payment method based on the corresponding magnetic stripe sequence command when the payment card is swept passed a card reader. For example and as described in U.S. patent application Ser. No. 13/904,939, in response to authenticating use of the payment card in Block S112, the processor can execute Block S116 by polling one or more input regions on the payment card for an input, correlating the input with a selection for a particular payment slot of the payment card, and arming the magnetic stripe emulator to implement a particular magnetic stripe sequence command corresponding to a magnetic stripe card assigned to the particular payment slot.

Alternatively, once a wireless connection is established between the payment card and a paired mobile computing device, the payment card can execute Block S116 by receiving a payment method selection from the mobile computing device over the wireless connection (and a corresponding magnetic sequence command when applicable) and preparing to drive the magnetic stripe emulator accordingly when the payment card is swept through a card reader. For example, multiple magnetic stripe sequence commands corresponding to various magnetic stripe cards (e.g., credit cards, gift cards, personal identification cards, door access cards, etc.) can be stored in memory on the mobile computing device and accessed through a native payment card application executing on the mobile computing device. The native payment card application can support an interface accessible by a user through the mobile computing device: to select magnetic sequence commands—from the set of magnetic sequence commands stored on the mobile computing device—to upload to particular payment slots of the payment card for subsequent manual selection at the payment card for the upcoming transaction; to select a particular magnetic sequence command—from the set of magnetic sequence commands stored on the mobile computing device—to upload to a default or primary payment slot on the payment card; and/or to select a particular magnetic sequence command—stored on the payment card—for emulation by the payment card during the subsequent transaction. Alternatively, once a wireless connection is established between the mobile computing device and the payment card, the native payment card application can automatically select a particular magnetic stripe card to emulate in the subsequent transaction—such as based on the location of the mobile computing device—and can automatically push the corresponding magnetic sequence command to the payment card.

However, the payment card can implement Block S116 locally or in cooperation with a paired mobile computing device to receive and handle a manual (or automatic) selection for a particular magnetic stripe card—for emulation in the subsequent transaction—in any other suitable way.

The processor within the payment card (and/or the native payment card application) can also select a first magnetic stripe card to emulate if the subsequent transaction with the payment card occurs while the payment card is in the primary payment mode and a second magnetic stripe card to emulate if the subsequent transaction with the payment card occurs while the payment card is in the secondary payment mode. For example, the processor can implement Block S116 to receive a manual selection for a debit card for emulation during the subsequent transaction and can thus set the debit card as a primary payment method for a subsequent transaction; the processor can also identify a credit card corresponding to a magnetic stripe sequence command stored on the payment card and set this credit card as a secondary payment method for the subsequent transaction. In this example, if the payment card is swept through a magnetic card reader while in the primary payment mode, the magnetic stripe emulator can thus emulate the debit card (i.e., the primary payment method), as the user is likely to be present to provide a personal identification number (or "PIN") corresponding to the debit card for the transaction; however, if the payment card is swept through a magnetic card reader while in the secondary payment mode (after transitioning from the primary payment mode into the sleep mode upon expiration of the second timer), as described below, the magnetic stripe emulator can emulate the credit card (i.e., the secondary payment method), since the user may no longer be present to provide the PIN for the debit card at this length of time after use of the payment card was authenticated in Block S112, such as if the transaction was later performed remotely from the user by a barkeeper (as in the example above) or by a waiter at a restaurant at the close of the user's meal. Alternatively, the native payment card application executing on the mobile computing device can implement similar techniques to elect a primary payment method (or magnetic stripe card) and/or a secondary payment method (or magnetic stripe card), and the processor can interface with the wireless communication module to download a magnetic stripe sequence command corresponding to the primary payment method and a magnetic stripe sequence command corresponding to the secondary payment method from the mobile computing device and store these in payment slots on the payment card accordingly.

In the foregoing variation, the payment card can also select a payment method of a first payment type (e.g., magnetic stripe) for the primary payment method and can select a second payment method of a second payment type (e.g., contactless NFC) (distinct from the first payment method) for the secondary payment method. The payment card can thus emulate one type of payment method (e.g., at a magnetic stripe emulator) in the primary payment method in Block S190 and can emulate a different type of payment method (e.g., at a NFC chip) in the secondary payment method in Block S190.

However, the processor, payment card, and/or the native payment card application can function in any other way to select a primary payment method and/or a secondary payment method for use in transaction at the payment card in the primary payment mode and the secondary payment mode, respectively.

7. Primary Payment Mode

Block S120 of the method recites, in the primary payment mode, activating a first timer of a first duration. Generally, Block S120 functions to set a maximum duration of the primary payment mode at the payment card by initiating the first timer, such as in response to transitioning into the primary payment mode, in response to authenticating the payment card for use (in a future or upcoming transaction) in Block S112, and/or in response to selection of a payment method in Block S114 or in Block S116, etc.

In one implementation, the processor executes Block S120 by initiating an internal timer for the first duration, such as between one minute and two minutes. For example, in Block S120, the processor can initiate the internal time for the first duration of ninety seconds such that the payment card will transition out of the primary payment mode and into the sleep state (i.e., a lower-power state) if the payment card is not used in a transaction within the ninety-second duration of the timer (i.e., if a magnetic read head or other card reader is not detected near the payment card prior to expiration of the timer), as described below; however, if a magnetic read head (or other card reader) is detected near the payment card while the payment card is in the primary payment mode and before the timer expires, the processor or other controller within the payment card can drive the magnetic stripe emulator according to a magnetic stripe sequence command corresponding to a magnetic stripe card selected for the transaction, such as selected in Block S114 or Block S116. However, the payment card can implement Block S120 to set the first timer of any other suitable duration and to initiate the first timer in response to any other action or event at the payment card. Alternatively, the native payment card application executing on the mobile computing device can initiate a timer for the first duration locally at the mobile computing device, and the payment card can interface with mobile computing device—via the wireless communication module—to retrieve a state (e.g., time) of the timer.

Block S130 of the method recites, in response to detecting a magnetic read head proximal the payment card prior to expiration of the first timer, transitioning from the primary payment mode into the off state. Generally, Block S130 interfaces with one or more magnetic read head sensors within the payment card to detect a card reader (including a magnetic read head) adjacent the payment card prior to expiration of the first timer, to trigger Block S190 to drive the magnetic stripe emulator within the payment card according to a magnetic sequence command corresponding to the magnetic stripe card (e.g., a payment method) elected in Block S114 or Block S116, and to transition the payment card back into the off state once emulation of the magnetic stripe card is completed.

As described in U.S. patent application Ser. No. 13/904,939, the processor can execute Block S130 by polling one or more magnetic read head sensors within the payment card while the first timer is current in the primary payment mode. For example, once the first timer is initiated in the primary payment mode, the processor can sample the magnetic read head sensor(s) at a rate of 20 Hz until an output of a magnetic read head sensor indicates that a magnetic read head is proximal the payment card or until the first timer expires. As in this example, if a magnetic read head is detected prior to expiration of the first timer, the processor can transition into Block S190, as described below, to drive (e.g., through the controller) the magnetic stripe emulator—during an emulation cycle—according to a particular magnetic sequence command selected for the transaction as the payment card is passed along the magnetic read head. Once the emulation cycle is complete, the processor can execute Block S130 by transitioning (the payment card) from the primary payment mode into the off state. However, if no magnetic read head (or other card reader) is detected near the payment card prior to expiration of the first timer, the processor can transition the payment card from the primary payment mode into the sleep mode in Block S140, as described below.

The processor can therefore execute Blocks 130 in the primary payment mode and while the first timer is counting down to actively poll a magnetic read head sensor within the payment card to detect a nearby card reader—such as the payment card enters into a read slot of the card reader—and to selectively execute Block S190 to output magnetic stripe data (of a previously-selected magnetic stripe card) to the card reader. However, the payment card can execute Block S130 in any other way to detect a card reader adjacent the payment card and to selectively execute Block S190 to read payment data into the card reader while in the primary payment mode and before expiration of the first timer.

8. Secondary Payment Mode

Block S140 of the method recites, in response to expiration of the first timer prior to detecting a magnetic read head proximal the payment card, transitioning from the primary payment mode into a sleep state. Generally, Block S140 functions to transition the payment card into a lower-power, higher-input sensitivity state (i.e., the sleep state, as described above) if the payment card fails to detect an adjacent card reader prior to expiration of the first timer. In particular, by transitioning the payment card into the sleep state in response to expiration of the first time in Block S140, the payment card can reduce local power consumption and thus extend battery life by limiting functions of the processor, the wireless communication module, and/or other components within the payment card. For example, in the sleep state, the payment card can disable the wireless communication module, shut down all sensor polling and processing functions of the processor, and set the processor to respond solely to a signal of sufficient magnitude (e.g., greater than the second input magnitude threshold), such as a digital high signal output from a piezoelectric transducer electrically coupled to the interrupt-enabled input pin of the processor, as described above. Furthermore, when transitioning from the primary payment mode into the sleep mode, the payment card can set an alternative (e.g., lower) input magnitude threshold for detecting an input on the card in the sleep state or select an alternative interrupt-enabled input pin of the processor to trigger the processor to wake from the sleep state into the secondary payment mode, as in Block S104 described below. Thus, in response to expiration of the first timer before a card reader is detected by the payment card, the payment card can execute Block S140 to transition into the sleep in which the payment card operates at a reduced power consumption setting with an increased sensitivity to an input on its surface to wake from the sleep state into the secondary payment mode.

The payment card can further maintain an authentication of use of the payment card—confirmed in the primary payment mode in Block S112—into the sleep mode and through subsequent transitions between the sleep mode and the secondary payment mode until a card reader is detected proximal the payment card and the selected magnetic stripe card emulated by the magnetic stripe emulator in a subsequent transaction, as in Block S190 described below. For example, the payment card: can execute Block S112 once (i.e., one time) in preparation for an upcoming transaction; can write authorization of use of the payment card to local memory; can read the authorization from the local memory in both the primary payment mode and the secondary payment mode, as applicable, before triggering the magnetic stripe emulator to emulate a selection magnetic stripe card; and can clear the authorization of use of the payment card once the magnetic stripe emulator completes an emulation cycle to emulate the selected magnetic stripe card. In this example, the payment card can also transition from the secondary payment mode into the off state in response to completion of the emulation cycle, repeat Block S110 to transition from the off state into the primary payment mode in response to an input on the surface of the payment card that exceeds the first input magnitude threshold, and then repeat Block S112 to authenticate use of the payment card in another transaction.

In the foregoing example, the payment card can also set a third timer—such as for a duration of five seconds—in response to completion of the emulation cycle, repeat the emulation cycle if a magnetic read head is detected adjacent the payment card prior to expiration of the third timer, and transition into the off state and clear the authorization of use of the payment card in response to expiration of the third timer; in particular, the payment card can maintain authorization of the payment card for some time after a first emulation cycle such that a second emulation cycle can be performed by the magnetic stripe emulator within some time after the first emulation cycle if the first emulation cycle was unsuccessful in communicating magnetic stripe data into the card reader without necessitating re-authorization of the payment card for the transactions. Thus, in the example above in which the user wakes the payment card from the off state into the primary payment mode, the payment card automatically authorizes use of the payment card by establishing a wireless connection with the user's smartphone, the user hands the payment card to a barkeeper, and the barkeeper places the payment card aside until the user decides to close out his tab: the payment card can transition into the secondary payment card when barkeeper later handles the payment card; can emulate a payment method selected earlier by the user when the barkeeper swipes the payment card through a card reader; can initiate the third timer (e.g., for five seconds) during or upon completion of the emulation cycle; and can again emulate the payment method when the barkeeper again swipes the payment card through the card reader—such as if the previous attempt to read the card was unsuccessful—if the card reader is detected by the payment card before the third timer expires.

Figure 6:
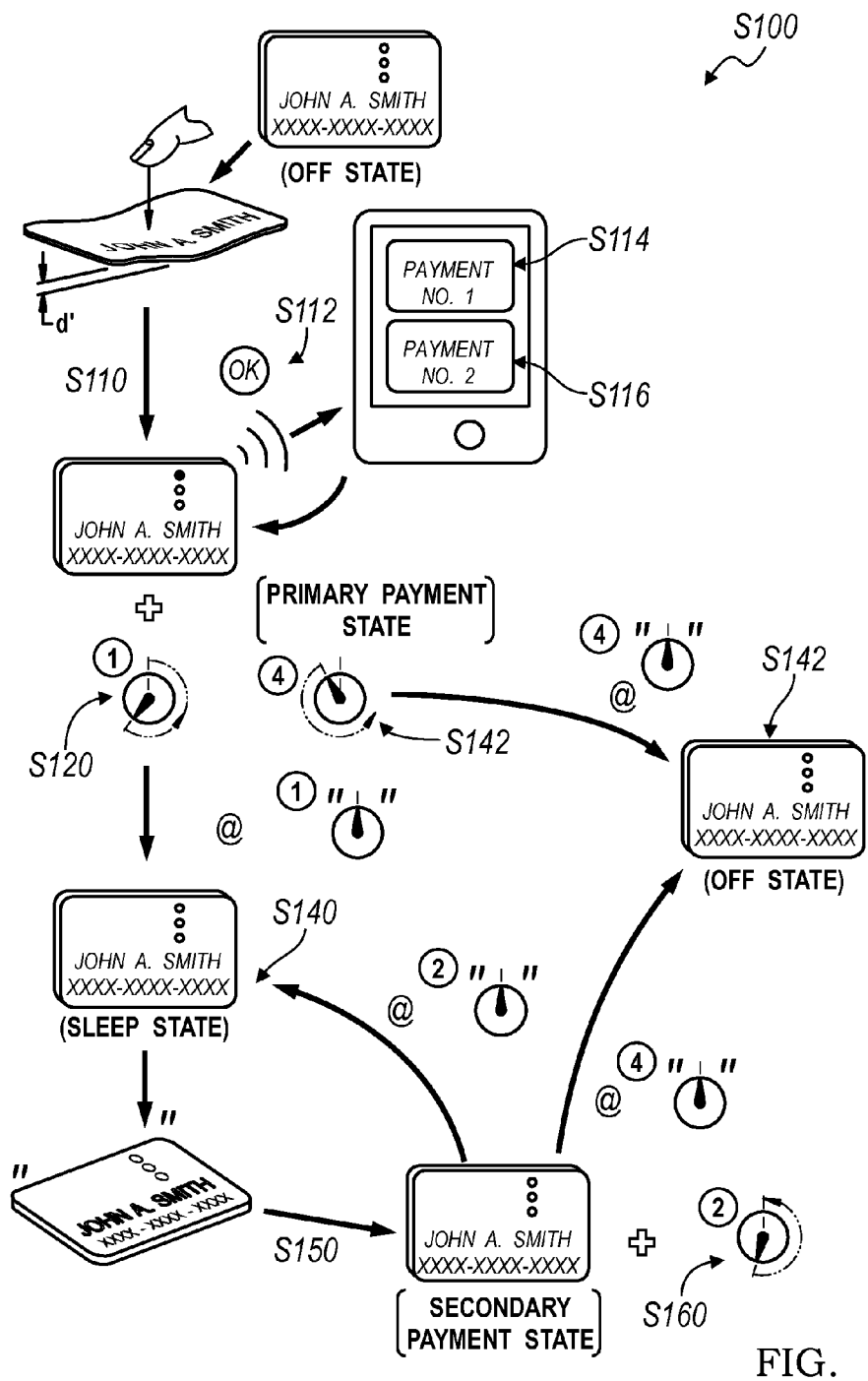
FIG. 6 is a flowchart representation in accordance with one variation of the method.

As shown in FIG. 6, one variation of the method includes Block S142, which recites activating a fourth timer of a fourth duration in response to transitioning from the primary payment mode into the secondary payment mode—the fourth duration greater than the first duration—and transitioning from the sleep state into the off state in response to expiration of the third time. Generally, Block S142 functions to set a timer defining a total duration of time in which the payment card is authenticated for use in a subsequent transaction. In particular, the payment card can execute Block S142 when the payment card transitions from the off state into the primary payment mode, when the payment card is authenticated for use in Block S112, when a payment method (or other magnetic stripe card) is selected for emulation in Block S114 or S116, or when the payment card transitions from the primary payment mode into the sleep state; and the payment card can clear an authorization of use of the payment card in response to expiration of the fourth timer regardless of whether or not a card reader has been detected near the payment card.

For example, the processor: can execute Block S120 to initiate the first timer for the first duration of approximately ninety seconds in response to entry into the primary payment mode or in response to authentication of the payment card in Block S112; can execute Block S142 to initiate the fourth timer for the fourth duration of approximately two hours in response to authentication of the payment card in Block S112 or in response to entry into the secondary payment mode; and can execute Block S160 to initiate the first timer for the first duration of approximately twelve-hundred milliseconds in response to entry into the secondary payment mode. In this example, the payment card can thus shut down (e.g., enter the off state) or otherwise de-authorize use of the payment card in an upcoming transaction if the fourth timer expires before a card reader is detected near the payment card. Thus, as in the example above in which the user hands the payment card to a barkeeper, the payment card can initiate the fourth timer for a duration of four hours, and the payment card can shut down— and thus disable a payment feature of the payment card—if the user forgets the payment card at the bar and does not return for it until the next day, thereby precluding use of the payment card in any further transactions until the user retrieves the payment card and the payment card can reauthorize use in Block S112, as described above.

However, the payment card can implement Block S142 in any other way to initiate a timer of any other length, such as a static fourth duration stored in memory in the payment card or a fourth duration selected by the user through the native payment card application executing on the mobile computing device and received from the mobile computing device by the payment card via the wireless communication module.

Block S150 of the method recites, in response to detecting an input on the surface of the payment card exceeding a second input threshold magnitude less than the first input threshold magnitude in the sleep state, transitioning from the sleep state into a secondary payment mode. Generally, Block S150 implements methods or techniques similar to those of Block S110 to detect an input on the payment card and to trigger the payment card to transition out of the sleep state and into the secondary payment mode, wherein the processor polls the magnetic read head sensor(s) to detect an adjacent card reader for a limited duration of time in the secondary payment mode. In particular, the payment card can operate at a heightened sensitivity in the sleep state such that simply picking up the payment card, jostling the payment card, or even placing the payment card in a read slot of card reader outputs a digital high voltage signal from the piezoelectric transducer, which in turn throws an interrupt at the second 'wake' interrupt-enabled input pin of the processor, thereby triggering Block S150 to transition the payment card out of the sleep state and into the secondary payment mode to poll the magnetic read head sensor(s) for a nearby card reader for a limited period to time.

In one example, the processor executes Block S150 by transitioning from the sleep state into the secondary payment mode in response to a magnitude value of a signal output from the piezoelectric transducer exceeding the second input threshold magnitude. In this example, the piezoelectric transducer outputs a signal of magnitude value exceeding the second input threshold magnitude in response to an input on the surface of the payment card that bends the surface out of plane by a second degree substantially less than the first degree of the primary payment mode described above. In another example, the processor samples a sensor (e.g., an accelerometer, a tilt sensor) within the payment card (e.g., at a secondary sampling rate in the sleep state slower than a primary sampling rate implemented by the processor in the off state), compares a form of an output of the sensor to the second input threshold magnitude, and transitions from the sleep state into the secondary payment mode in response to the form of the second output of the sensor exceeding the second input threshold magnitude, such as described above in Block S110.

In Block S150, the payment card can further set a limit to sequential inputs that trigger transition into the second payment mode. In particular, for handling of the payment card that repeatedly wakes the payment card from the sleep state into the secondary payment mode, the payment card can track a number and/or frequency of transitions from the sleep state into the secondary payment mode within a period of time and disable the trigger to transition from the sleep state into the secondary payment mode once a threshold number or frequency of transitions have occurred within the period of time. For example, if the payment card is set in the sleep mode and then placed on bar in a club with loud, bass-heavy music, placed on rattling dashboard, or left in a washing machine, the payment card can disable the transition trigger for entering into the secondary payment mode once ten transitions have occurred sequentially, once seven transitions have occurred within a thirty-second period of time, and/or if a rate of more than one transition per two-second interval has occurred within a period of ten seconds, etc. The payment card can thus prolong the life of an internal or integrated battery by disabling repeated transitions into a higher-power setting (e.g., the secondary payment mode). In this implementation, once the transition trigger is disabled, the payment card can set a fifth timer—such as for thirty seconds or one minute—and maintain the transition trigger in the disabled state until the fifth timer expires; once the fifth timer expires, the payment card can again enable the transition trigger and transition from the sleep state into the secondary payment mode in response to an input of sufficient magnitude onto the card. The payment card in the sleep state can thus emulate the off state by ignoring inputs of magnitude less than the first input threshold magnitude until the fifth timer expires. Alternatively, the payment card can transition from the sleep mode into the off state in response to an excess number and/or frequency of transitions from the sleep state into the secondary payment mode, such as within a threshold period. However, the payment card can handle an excess number and/or frequency of transitions from the sleep state into the secondary payment mode in any other way in Block S150. The payment card implement similar methods or techniques to handle excess transitions from the off state into the primary payment mode in Block S110.

Block S160 of the method recites, in response to entering the secondary payment mode, activating a second timer of a second duration less than the first duration. Block S160 can similarly recite, in the secondary payment mode, activating a second timer of a second duration less than the first duration. Generally, once Block S150 detects an input on the payment card and transitions the payment card from the sleep state into the secondary payment mode, Block S160 functions to set a second timer specifying a limited period of time during which the processor will poll the magnetic read head sensor(s) for a nearby card reader in Block S170 before Block S180 transitions the payment card back into the sleep mode.

In one example, Block S160 initiates the second timer specifying a duration of five-hundred milliseconds such that Block S180 transitions the payment card out of the secondary payment mode and back into the lower-power sleep state if the payment card is not used in a transaction within five-hundred milliseconds of the transition into the secondary payment mode in Block S150. Block S160 can thus set and trigger the second timer on the payment card to limit durations of time in which the processor polls the magnetic read head sensor(s) to periods characterized by events most likely to lead to use of the payment card at a card reader. In particular, the processor can execute Block S160 to initiate the second timer for a limited period of time in response to detected handling of the payment card (e.g., as detected by subtle deflection or other minimal input on the payment card), which may occur just before the payment card is swept through a card reader during a transaction. However, Block S160 can set the second timer at any other suitable duration (e.g., between one-hundred milliseconds and one second) locally on the payment card and can initiate the second timer in response to any other suitable transition event at the payment card.

Block S180 of the method recites, in response to expiration of the second timer prior to detecting a magnetic read head proximal the payment card, transitioning from the secondary payment mode into the sleep state. Generally, Block 8180 functions to transition the payment card from the second payment mode back into the sleep state if the magnetic read head sensor(s) fails to detect a card reader (e.g., a magnetic read head) proximal the payment card prior to expiration of the second timer. The payment card can thus repeat Blocks S180, S150, and S160 to cycle the payment card between the low-power, high-sensitivity sleep state and the high(er)-power second payment mode in response to detected handling of the payment card (e.g., as the payment card is picked up, jostled, or otherwise manipulated) and in response to expiration of the second timer until an adjacent card reader is detected in Block S170 and an emulation cycle initiated at the magnetic stripe emulator. Thus, as described above, the payment card can maintain authentication of the payment card for use—as originally set in Block S112—throughout cycles of Blocks S180, S150, and S160 until a transaction with the payment card is initiated by proximity of the payment card to a card reader.

Block S170 of the method recites, in response detecting a magnetic read head proximal the payment card prior to expiration of the second timer, transitioning from the secondary payment mode into the off state. Block S170 can similarly recite, in response completion of the emulation cycle, transitioning from the secondary payment mode into the off state. Generally, Block S170 implements methods or techniques similar to those of Block S130 to poll a magnetic read head sensor, to detect a magnetic read head (or other card reader) adjacent the payment card, to trigger Block S190 to drive the magnetic stripe emulator according to a magnetic sequence command corresponding to a magnetic stripe card selected in Block S114 or S116, and to transition the payment card from the secondary payment mode into the off state once payment method data is communicated into the card reader in Block S190. The processor can thus execute Block S170 to transition the payment card out of the secondary payment mode and into the off state (i.e., a low(er)-power, low(er)-input sensitivity state), and the processor can further remove an authentication status of the payment card once the payment card transitions back into the off state in Block S170 such that use of the payment card must be authenticated once again before the payment card can be used in a subsequent transaction to emulate a payment method or other magnetic stripe card.

In one example, the payment card implements Block S150 by responding to deflection of the payment card as the payment card is placed in a slot of a card reader and transitions the payment card into the secondary payment mode accordingly; the payment card further implements Block S160 by setting the second timer to a default duration of five-hundred milliseconds. The processor then interfaces with a magnetic read head sensor within the payment card adjacent a leading edge of the magnetic stripe emulator in Block S170 to detect a magnetic read head within the card reader prior to expiration of the second timer (i.e., within five-hundred milliseconds), and the processor triggers the magnetic stripe emulator to output a magnetic sequence corresponding to the elected payment method (i.e., according to the corresponding magnetic strip sequence command) in Block S190 before transitioning the payment card back into the off state in Block S180.

However, the payment card can implement Blocks S150, S160, S170, and S180 in any other way to intermittently transition the payment card between the sleep state in which functions of the payment card are suppressed and the secondary payment mode in which the payment card emulates a selected magnetic stripe card when an adjacent card reader is detected.

9. Transaction

Block S190 of the method recites, in the primary payment mode and in the secondary payment mode, in response to detecting a magnetic read head proximal the payment card, driving a magnetic stripe emulator within the payment card according to a magnetic sequence command stored on the payment card and corresponding to a magnetic stripe card. Block S190 can similarly recite, in the secondary payment mode, in response to detecting a magnetic read head proximal the payment card prior to expiration of the second timer, driving a magnetic stripe emulator within the payment card during an emulation cycle according to a magnetic sequence command stored on the payment card and corresponding to a static magnetic stripe card. Generally, the payment card executes Block S190 to drive the magnetic stripe emulator according to a magnetic sequence command corresponding to the payment method—or other magnetic stripe card selected for the transaction in Block S114 or Block S116—in response to detecting an adjacent card reader and/or in response to detecting movement of the payment card through an adjacent card reader (e.g., in Block S130 or in Block S170). For example, the processor can execute Block S190 to prompt the magnetic stripe emulator to mimic (e.g., emulate, replicate) an output of the original magnetic stripe card (e.g., a credit card, a debit card, a gift card) selected for the transaction, such as described in U.S. patent application Ser. No. 13/904,939.

Furthermore, with the payment card in the primary payment mode, once the magnetic stripe emulator completes transmission of a magnetic sequence corresponding to the elected payment method (i.e., an "emulation cycle"), the processor can transition the payment card back into the off state, as in Block S130. Similarly, with the payment card in the secondary payment mode, once the magnetic stripe emulator has completed an emulation cycle according to the magnetic sequence command corresponding to the elected magnetic stripe card, the processor can transition the payment card back into the off state, as in Block S170.

In one implementation, in the primary payment mode, the magnetic stripe emulator emulates a static magnetic stripe of a particular payment method—selected for the transaction in Block S114—in response to detecting a magnetic read head proximal the payment card in Block S190. In the primary payment mode, the processor polls a magnetic read head sensor arranged within the payment card (e.g., at a sampling rate of 20 Hz) while the first timer is active, and the processor then triggers the controller to drive the magnetic stripe emulator according to the magnetic sequence command corresponding to the particular payment method in response to an output of the magnetic read head sensor indicating proximity of a magnetic read head adjacent the payment card occurring before expiration of the first timer. Furthermore, in this implementation, in the secondary payment mode, the processor polls the magnetic read head sensor while the second timer is active and then triggers the controller to drive the magnetic stripe emulator according to the (same) magnetic sequence command corresponding to the (same) selected payment method in response to an output of the magnetic read head sensor corresponding to proximity of a magnetic read head adjacent the payment card occurring prior to expiration of the second timer.

Alternatively, as described above, in the primary payment mode, the processor can trigger the controller to drive the magnetic stripe emulator according to a first magnetic sequence command corresponding to a primary payment method selected for the transaction in response to an output of the magnetic read head sensor corresponding to proximity of a magnetic read head adjacent the payment card occurring prior to expiration of the first timer. Furthermore, in the secondary payment mode, the processor can trigger the controller to drive the magnetic stripe emulator according to a second magnetic sequence command corresponding to a secondary payment method selected for the transaction in response to an output of the magnetic read head sensor corresponding to proximity of a magnetic read head adjacent the payment card occurring prior to expiration of the second timer, wherein the secondary payment method (e.g., secondary magnetic stripe card) is distinct from the primary payment method (or primary magnetic stripe card).

However, the payment card can implement Block S190 in any other way to emulate one or more elected magnetic stripe cards in the primary payment mode and in the secondary payment mode.

10. Input Threshold Magnitudes

As shown in FIG. 5, one variation of the method includes Block S102, which recites, at the payment card, in the off state, applying a first input threshold magnitude for detecting an input on a surface of the payment card. In this variation, the method can further include Block S104, which recites, in the sleep state, applying a second input threshold magnitude for detecting an input on the surface of the payment card, the second input threshold magnitude less than the first input threshold magnitude. Generally, Block S102 functions to set, select, or apply a first sensitivity of the payment card to an input to trigger transition from the off state into the primary payment mode, and Block S104 functions to set, select, or apply a first a second sensitivity of the payment card to an input to trigger transition from the sleep state into the secondary payment mode. In particular, in the off state, the payment card exhibits a first sensitivity to an input mechanism for triggering transition out of the off state (and into the primary payment mode) such that the payment card executes Block S110 in response to an input (e.g., impact) a first magnitude onto a surface of the payment card; in the sleep state, the payment card exhibits a second sensitivity—greater than the first sensitivity—to the input mechanism to trigger transition out of the sleep state (and into the secondary payment mode) such that the payment card executes Block S150 in response to an input (e.g., impact) a second magnitude—(substantially) relatively less than the first magnitude—onto the surface of the payment card.

In one implementation in which the payment card includes a piezoelectric transducer, the piezoelectric transducer is electrically coupled to a first 'wake' interrupt-enabled input pin of the processor via a first signal conditioning circuit within the payment card and is electrically coupled to a second 'wake' interrupt-enabled input pin of the processor via a second signal conditioning circuit within the payment card. In this implementation, the first signal conditioning circuit defines a first input voltage threshold to trigger a digital high voltage signal to the first interrupt-enabled pin, and the second signal conditioning circuit defines a second input voltage threshold—less than the first input voltage threshold—to trigger a digital high voltage signal to the second interrupt-enabled pin. For example, the piezoelectric transducer can be electrically coupled to the first interrupt-enabled input pin via a first Zener diode with a first breakdown voltage of 3V, and the piezoelectric transducer can be electrically coupled to the second interrupt-enabled input pin via a second Zener diode with a second breakdown voltage of 1.8V. In this implementation, the processor can execute Block S102 by enabling the first interrupt-enabled input pin and disabling the second interrupt-enabled pin when the payment card transitions into the off state, and the processor can execute Block S104 by enabling the second interrupt-enabled input pin and disabling the first interrupt-enabled pin when the payment card transitions into the sleep state.

In a similar implementation, the piezoelectric transducer can be electrically coupled to a 'wake' interrupt-enabled input pin of the processor via a first signal conditioning circuit and a second signal conditioning circuit in parallel with the first signal conditioning circuit. As in the foregoing implementation, the first signal conditioning circuit defines a first input voltage threshold to trigger a digital high voltage signal to the first interrupt-enabled pin, and the second signal conditioning circuit defines a second input voltage threshold—less than the first input voltage threshold—to trigger a digital high voltage signal to the second interrupt-enabled pin. In this implementation, the first and second signal conditioning circuits electrically coupled to and selectively enabled and disabled by a latch (e.g., a bistable multivibrator); the processor can thus execute Block S102 by setting the latch to enable the first signal conditioning circuit and to disable the second signal conditioning circuit when the payment card transitions into the off state, and the processor can execute Block S104 by setting the latch to enable the second signal conditioning circuit and to disable the first signal conditioning circuit when the payment card transitions into the sleep state.

In yet another implementation, the payment card includes a first piezoelectric transducer coupled to a first 'wake' interrupt-enabled input pin of the processor and a second piezoelectric transducer coupled to a second 'wake' interrupt-enabled input pin of the processor, wherein the second piezoelectric transducer outputs a greater voltage and/or current for an input of the same input magnitude than the first piezoelectric transducer. For example, the first piezoelectric transducer can be of a first size, and the second piezoelectric transducer can be of a second size greater than the first size and thus output a greater voltage that the first piezoelectric transducer for an input of a particular magnitude (or rate), such as shown in FIG. 5. Additionally or alternatively, the second piezoelectric transducer can be arranged across the effective center of the broad face of the payment card, and the first piezoelectric transducer can be arranged near a corner of the broad face of the payment card such that the second piezoelectric transducer is more sensitive to an input on the payment card—that deflects the broad face of the payment cad—than the first piezoelectric transducer. In this implementation, the processor can execute Block S102 by enabling the first interrupt-enabled input pin and disabling the second interrupt-enabled pin when the payment card transitions into the off state, and the processor can execute Block S104 by enabling the second interrupt-enabled input pin and disabling the first interrupt-enabled pin when the payment card transitions into the sleep state.

Yet alternatively, the payment card can include piezoelectric transducer coupled to an input pin of the processor, and the processor can sample the input pin in both the off state and the sleep state to trigger transition into the primary payment mode and into the secondary payment mode, respectively. In this implementation, the input pin of the processor can incorporate or be electrically coupled to an analog-to-digital converter (e.g., an 8-bit A/D converter) within the processor; the processor can implement Block S102 by setting a first digital threshold value (e.g., "200") for triggering transition from the off state into the primary payment mode when the payment card enters into the off state, and the processor can implement Block S104 by setting a second digital threshold value (e.g., "120") for triggering transition from the sleep state into the secondary payment mode when the payment card enters into the sleep state. The processor can also adjust a sampling rate of the piezoelectric transducer based on the state of the payment card, such as by setting a first sampling rate of 2 Hz for the off state and setting a second sampling rate of 10 Hz for the sleep state. The processor can implement similar methods and techniques for detecting and handling outputs of a motion sensor, mechanical sensor, or other sensor within the payment card in response to an input on the surface of the payment card.

However, the payment card can implement Block S102 and Block S104 in any other way to set or adjust a sensitivity of the payment card to an input thereonto based on a current (or upcoming) state of the payment card.

The payment card can also respond to different input mechanisms in Block S110 and in Block S150. For example, the payment card can transition from the off state into the primary payment mode in Block S110 in response to an input on the payment card triggering an output of sufficient magnitude from a piezoelectric transducer within the payment card and then transition from the sleep state into the secondary payment mode in Block S150 in response to an input on the payment card triggering an output of sufficient magnitude from an accelerometer within the payment card.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile computing device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for facilitating payment with a payment card comprising:
    at the payment card, in response to detecting an input on a surface of the payment card exceeding a first input threshold magnitude, transitioning from an off state into a primary payment mode;
    in the primary payment mode, activating a first timer of a first duration;
    following detecting a magnetic read head proximal the payment card prior to expiration of the first timer, transitioning from the primary payment mode into the off state;
    in response to expiration of the first timer prior to detecting a magnetic read head proximal the payment card, transitioning from the primary payment mode into a sleep state;
    in response to detecting an input on the surface of the payment card exceeding a second input threshold magnitude less than the first input threshold magnitude in the sleep state, transitioning from the sleep state into a secondary payment mode;
    in response to entering the secondary payment mode, activating a second timer of a second duration less than the first duration;
    following detecting a magnetic read head proximal the payment card prior to expiration of the second timer, transitioning from the secondary payment mode into the off state;
    in response to expiration of the second timer prior to detecting a magnetic read head proximal the payment card, transitioning from the secondary payment mode into the sleep state; and
    in the primary payment mode and in the secondary payment mode, in response to detecting a magnetic read head proximal the payment card, driving a magnetic stripe emulator within the payment card according to a magnetic sequence command stored on the payment card and corresponding to a magnetic stripe card.

2. The method of claim 1, wherein transitioning from the off state into the primary payment mode comprises, in the off state, polling a sensor within the payment card, comparing a form of an output of the sensor to the first input threshold magnitude, and transitioning from the off state into the primary payment mode in response to the form of the output of the sensor exceeding the first input threshold magnitude.

3. The method of claim 2, wherein transitioning from the sleep state into the secondary payment mode comprises, in the sleep state, polling the sensor, comparing a form of a second output of the sensor to the second input threshold magnitude, and transitioning from the sleep state into the secondary payment mode in response to the form of the second output of the sensor exceeding the second input threshold magnitude.

4. The method of claim 1, wherein transitioning from the off state into the primary payment mode comprises transitioning from the off state into the primary payment mode in response to a magnitude value of a signal output from a piezoelectric transducer arranged within the payment card exceeding the first input threshold magnitude, the piezoelectric transducer outputting a signal of magnitude value exceeding the first input threshold magnitude in response to an input on the surface of the payment card that bends the surface out of plane by at least a first degree.

5. The method of claim 4, wherein transitioning from the sleep state into the secondary payment mode comprises transitioning from the sleep state into the secondary payment mode in response to a magnitude value of a signal output from the piezoelectric transducer exceeding the second input threshold magnitude, the piezoelectric transducer outputting a signal of magnitude value exceeding the second input threshold magnitude in response to an input on the surface of the payment card that bends the surface out of plane by at least a second degree less than the first degree.

6. The method of claim 1, wherein driving the magnetic stripe emulator according to the magnetic sequence command in the primary payment mode comprises polling a magnetic read head sensor arranged within the payment card while the first timer is active and driving the magnetic stripe emulator according to the magnetic sequence command in response to an output of the magnetic read head sensor corresponding to a magnetic read head adjacent the payment card prior to expiration of the first timer; and wherein driving the magnetic stripe emulator according to the magnetic sequence command in the secondary payment mode comprises polling the magnetic read head sensor while the second timer is active and driving the magnetic stripe emulator according to the magnetic sequence command in response to an output of the magnetic read head sensor corresponding to a magnetic read head adjacent the payment card prior to expiration of the second timer.

7. The method of claim 1, wherein driving the magnetic stripe emulator according to the magnetic sequence command in the first payment mode comprises detecting a magnetic read head adjacent the payment card and driving the magnetic stripe emulator according to the magnetic sequence command as the payment card is passed along the magnetic read head during an emulation cycle; and wherein transitioning from the primary payment mode into the off state comprises transitioning from the primary payment mode into the off state in response to completion of the emulation cycle.

8. The method of claim 1, further comprising, in response to entering the primary payment mode, authenticating use of the payment card in a future transaction.

9. The method of claim 8, wherein authenticating use of the payment card in the future transaction comprises attempting wireless communication with a computing device paired with the payment card and arming a controller within the payment card to drive the magnetic stripe emulator according to the magnetic stripe sequence command in response to establishing a wireless connection with the computing device.

10. The method of claim 8, wherein activating the first timer comprises activating the first timer in response to authenticating use of the payment card in the future transaction.

11. The method of claim 1, further comprising, in response to entering the primary payment mode, assigning a particular payment method selected for a preceding transaction to a default payment slot on the payment card; wherein driving the magnetic stripe emulator according to the magnetic sequence command comprises, at the magnetic stripe emulator, emulating a static magnetic stripe of the particular payment method in response to detecting a magnetic read head proximal the payment card.

12. The method of claim 1, further comprising, in the primary payment mode, at the payment card, receiving a selection for a particular payment method from a set of payment methods stored on the payment card and arming a controller within the payment card to drive the magnetic stripe emulator according to a magnetic sequence command corresponding to the particular payment method in response to the selection for the particular payment method.

13. The method of claim 1, further comprising activating a third timer of a third duration in response to transitioning from the primary payment mode into the secondary payment mode, the third duration greater than the first duration; and further comprising transitioning from the sleep state into the off state in response to expiration of the third time.

14. The method of claim 13, wherein activating the first timer comprises initiating the first timer for the first duration between one minute and two minutes; wherein activating the second timer comprises initiating the second timer for the second duration between one-hundred milliseconds and one second; and wherein activating the third timer comprises initiating the third timer for the third duration exceeding one hour.

15. A method for facilitating payment with a payment card comprising:
- at the payment card, in an off state, applying a first input threshold magnitude for detecting an input on a surface of the payment card;
- in response to detecting an input on the surface of the payment card exceeding the first input threshold magnitude, transitioning from the off state into a primary payment mode;
- in the primary payment mode, activating a first timer of a first duration;
- in response to expiration of the first timer prior to detecting a magnetic read head proximal the payment card, transitioning from the primary payment mode into a sleep state;
- in the sleep state, applying a second input threshold magnitude for detecting an input on the surface of the payment card, the second input threshold magnitude less than the first input threshold magnitude;
- in response to detecting an input on the surface of the payment card exceeding the second input threshold magnitude in the sleep state, transitioning from the sleep state into a secondary payment mode;
- in the secondary payment mode, activating a second timer of a second duration less than the first duration;
- in the secondary payment mode, in response to detecting a magnetic read head proximal the payment card prior to expiration of the second timer, driving a magnetic stripe emulator within the payment card during an emulation cycle according to a magnetic sequence command stored on the payment card and corresponding to a static magnetic stripe card; and
- following completion of the emulation cycle, transitioning from the secondary payment mode into the off state.

16. The method of claim 15, further comprising, in response to expiration of the second timer prior to detecting a magnetic read head proximal the payment card, transitioning from the secondary payment mode into the sleep state.

17. The method of claim 15, further comprising, in the primary payment mode, in response to detecting a magnetic read head proximal the payment card prior to expiration of the first timer, driving the magnetic stripe emulator according to the magnetic sequence command.

18. The method of claim 17, wherein driving the magnetic stripe emulator according to the magnetic sequence command in the first payment mode comprises detecting a magnetic read head adjacent the payment card and driving the magnetic stripe emulator according to the magnetic sequence command as the payment card is passed along the magnetic read head during an emulation cycle; and wherein transitioning from the primary payment mode into the off state comprises transitioning from the primary payment mode into the off state in response to completion of the emulation cycle.

19. The method of claim 15, wherein driving the magnetic stripe emulator according to the magnetic sequence command in the secondary payment mode comprises driving the magnetic stripe emulator according to the magnetic sequence command corresponding to the magnetic stripe card assigned to the secondary payment mode; and further comprising, in the primary payment mode, driving the magnetic stripe emulator according to a primary magnetic sequence command corresponding to a primary magnetic stripe card assigned to the primary payment mode in response to detecting a magnetic read head proximal the payment card prior to expiration of the first timer, the primary magnetic stripe card distinct from the magnetic stripe card.

20. The method of claim 15, wherein activating the first timer comprises initiating the first timer for the first duration between one minute and two minutes; and wherein activating the second timer comprises initiating the second timer for the second duration between one-hundred milliseconds and one second.

* * * * *